(12) United States Patent
Sippel et al.

(10) Patent No.: US 10,746,037 B2
(45) Date of Patent: Aug. 18, 2020

(54) TURBINE SHROUD ASSEMBLY WITH TANDEM SEALS

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 286 days.

(21) Appl. No.: 15/803,342

(22) Filed: Nov. 3, 2017

(65) Prior Publication Data

US 2018/0149031 A1 May 31, 2018

Related U.S. Application Data

(60) Provisional application No. 62/428,282, filed on Nov. 30, 2016.

(51) Int. Cl.
*F01D 11/00* (2006.01)
*F01D 9/04* (2006.01)
*F01D 25/24* (2006.01)
*F01D 11/08* (2006.01)

(52) U.S. Cl.
CPC ............ *F01D 11/005* (2013.01); *F01D 9/04* (2013.01); *F01D 25/246* (2013.01); *F01D 11/08* (2013.01); *F05D 2220/32* (2013.01); *F05D 2240/11* (2013.01); *F05D 2260/31* (2013.01); *F05D 2300/10* (2013.01); *Y02T 50/672* (2013.01)

(58) Field of Classification Search
CPC ...... F01D 11/003; F01D 11/005; F01D 11/08; F16J 15/16; F16J 15/166
USPC ......... 415/170.1, 173.1, 173.3, 174.2, 213.1, 415/214.1
See application file for complete search history.

(56) References Cited

U.S. PATENT DOCUMENTS

| 3,836,159 A | 9/1974 | Dryer |
| 4,219,203 A | 8/1980 | Lovelace et al. |
| 4,248,439 A | 2/1981 | Haslett |

(Continued)

FOREIGN PATENT DOCUMENTS

| EP | 2357322 A2 | 8/2011 |
| EP | 2660429 A1 | 11/2013 |

(Continued)

OTHER PUBLICATIONS

Extended European Search Report dated Jun. 22, 2018 issued in connection with European Patent Appln. No. 17203259.1; 7 pages.

*Primary Examiner* — Erick R Solis
*Assistant Examiner* — Robert A Werner
(74) *Attorney, Agent, or Firm* — Barnes & Thornburg LLP (57) ABSTRACT

An assembly adapted for use in a gas turbine engine has a carrier component and a supported component. The assembly including a mounting system for coupling the supported component to the carrier component and a seal adapted to resist the movement of gasses between the supported component to the carrier component. In an illustrative embodiment, the assembly is a turbine shroud segment for blocking gasses from passing over turbine blades included in the gas turbine engine.

18 Claims, 10 Drawing Sheets

(56) References Cited

U.S. PATENT DOCUMENTS

| | | | |
|---|---|---|---|
| 4,441,726 A | 4/1984 | Uhl | |
| 4,457,523 A | 7/1984 | Halling et al. | |
| 4,500,098 A | 2/1985 | Wilcox et al. | |
| 4,602,888 A | 7/1986 | Court et al. | |
| 5,014,917 A | 5/1991 | Sirocky et al. | |
| 5,074,748 A | 12/1991 | Hagle | |
| 5,088,888 A | 2/1992 | Bobo | |
| 5,154,577 A | 10/1992 | Kellock et al. | |
| 5,188,506 A * | 2/1993 | Creevy | F01D 11/005 277/643 |
| 5,236,202 A | 8/1993 | Krouth et al. | |
| 5,358,262 A | 10/1994 | Roberts | |
| 5,639,100 A | 6/1997 | Garrigues et al. | |
| 6,164,656 A | 12/2000 | Frost | |
| 6,857,639 B2 | 2/2005 | Beeck et al. | |
| 6,883,807 B2 | 4/2005 | Smed | |
| 6,997,673 B2 | 2/2006 | Morris et al. | |
| 7,090,224 B2 | 8/2006 | Iguchi et al. | |
| 7,090,459 B2 | 8/2006 | Bhate et al. | |
| 7,258,942 B2 | 8/2007 | Chou et al. | |
| 7,347,425 B2 * | 3/2008 | James | F16J 15/0887 277/644 |
| 7,451,989 B1 | 11/2008 | Cornett et al. | |
| 7,497,443 B1 | 3/2009 | Steinetz et al. | |
| 7,736,122 B1 | 6/2010 | Stone | |
| 7,857,323 B1 | 12/2010 | Berkes et al. | |
| 8,047,550 B2 | 11/2011 | Behrens et al. | |
| 8,157,511 B2 | 4/2012 | Pietrobon et al. | |
| 8,511,972 B2 | 8/2013 | Sutcu | |
| 8,568,091 B2 | 10/2013 | McCaffrey | |
| 8,651,497 B2 | 2/2014 | Tholen et al. | |
| 8,695,689 B2 | 4/2014 | Kohl et al. | |
| 8,794,640 B2 | 8/2014 | Bergman et al. | |
| 8,905,709 B2 | 12/2014 | Dziech et al. | |
| 9,052,016 B2 | 6/2015 | Twelves | |
| 9,341,072 B2 | 5/2016 | Hanumanthan et al. | |
| 9,399,924 B2 | 7/2016 | Klingels | |
| 9,435,266 B2 | 9/2016 | Sutterfield et al. | |
| 9,476,316 B2 | 10/2016 | Hillier | |
| 9,488,110 B2 | 11/2016 | Chan et al. | |
| 9,512,735 B2 | 12/2016 | Davis | |
| 9,534,500 B2 | 1/2017 | Bouchard et al. | |
| 9,587,502 B2 | 3/2017 | Davis et al. | |
| 9,617,920 B2 | 4/2017 | Headland | |
| 9,745,854 B2 * | 8/2017 | Baldiga | F01D 11/003 |
| 9,759,079 B2 | 9/2017 | Sippel et al. | |
| 9,822,656 B2 | 11/2017 | Bricaud et al. | |
| 9,863,323 B2 | 1/2018 | Kirtley et al. | |
| 9,932,844 B2 | 4/2018 | Sutterfield et al. | |
| 9,945,256 B2 | 4/2018 | Freeman et al. | |
| 9,951,640 B2 | 4/2018 | Westphal et al. | |
| 9,957,827 B2 | 5/2018 | Davis et al. | |
| 10,047,624 B2 | 8/2018 | O'Leary et al. | |
| 10,082,085 B2 | 9/2018 | Thomas et al. | |
| 10,088,049 B2 | 10/2018 | Davis et al. | |
| 10,094,231 B2 | 10/2018 | Dev et al. | |
| 10,113,437 B2 | 10/2018 | Davis et al. | |
| 10,196,911 B2 | 2/2019 | Jenkins et al. | |
| 10,196,912 B2 | 2/2019 | Davis et al. | |
| 10,202,863 B2 | 2/2019 | Davis et al. | |
| 10,208,613 B2 | 2/2019 | Davis et al. | |
| 2005/0220611 A1 * | 10/2005 | Bhate | F01D 11/025 415/173.3 |
| 2006/0038358 A1 * | 2/2006 | James | F01D 11/005 277/641 |
| 2006/0082074 A1 | 4/2006 | Synnott et al. | |
| 2007/0031258 A1 | 2/2007 | Campbell | |
| 2012/0260670 A1 | 10/2012 | Foster et al. | |
| 2013/0113168 A1 | 5/2013 | Lutjen et al. | |
| 2013/0156550 A1 | 6/2013 | Franks et al. | |
| 2014/0030072 A1 | 1/2014 | Hillier et al. | |
| 2014/0154062 A1 | 6/2014 | Weber et al. | |
| 2014/0271147 A1 | 9/2014 | Uskert et al. | |
| 2015/0071761 A1 * | 3/2015 | Headland | F01D 9/041 415/110 |
| 2015/0167557 A1 * | 6/2015 | Thomas | F02C 7/28 60/796 |
| 2016/0177786 A1 | 6/2016 | Sippel et al. | |
| 2016/0186588 A1 | 6/2016 | Davis et al. | |
| 2016/0333720 A1 | 11/2016 | Davis | |
| 2016/0348526 A1 | 12/2016 | Vetters et al. | |
| 2016/0376901 A1 * | 12/2016 | O'Leary | F01D 11/005 415/116 |
| 2018/0149031 A1 | 5/2018 | Sippel et al. | |
| 2018/0238193 A1 | 8/2018 | Baucco | |
| 2018/0298773 A1 | 10/2018 | Vetters | |

FOREIGN PATENT DOCUMENTS

| | | |
|---|---|---|
| EP | 2690260 A2 | 1/2014 |
| EP | 2886803 A1 | 6/2015 |
| EP | 2955328 A1 | 12/2015 |
| EP | 3037628 A1 | 6/2016 |
| GB | 2417528 A | 3/2006 |

* cited by examiner

TURBINE SHROUD ASSEMBLY WITH TANDEM SEALS

CROSS REFERENCE TO RELATED APPLICATIONS

This application claims priority to and the benefit of U.S. Provisional Patent Application No. 62/428,282, filed 30 Nov. 2016, the disclosure of which is now expressly incorporated herein by reference.

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds and other assemblies in gas turbine engines include components made from materials that have different coefficients of thermal expansion. Due to the differing coefficients of thermal expansion, the components can expand at different rates when exposed to combustion products. In some examples, sealing between and coupling such components can present challenges.

SUMMARY

The present disclosure may comprise one or more of the following features and combinations thereof.

According to the present disclosure, a turbine shroud segment assembly adapted for use in a gas turbine engine may include a carrier segment, a blade track segment, and a tandem seal. The carrier segment includes metallic materials and is formed to define an attachment-receiving space. The blade track segment includes ceramic matrix composite materials and is formed to include a runner shaped to extend partway around a central axis and an attachment portion that extends radially outward from the runner into the attachment-receiving space formed by the carrier segment.

In illustrative embodiments, the tandem seal is received in a radially-inwardly opening channel formed in the carrier segment and engages the blade track segment to block the movement of gasses through an interface between the carrier segment and the blade track segment. The tandem seal includes a wire seal and a rope seal configured to be compressed between the carrier segment and the blade track segment while remaining engaged with the wire seal.

In illustrative embodiments, the rope seal includes a metallic overbraid sheath and the wire seal is a single strand of solid metallic material. The tandem seal is arranged to separate a first compartment configured to be pressurized at a first level during use of the turbine shroud segment in a gas turbine engine and a second compartment configured to be pressurized at a second level, greater than the first level, during use of the turbine shroud in a gas turbine engine. The rope seal is arranged axially between the wire seal and the second compartment.

In illustrative embodiments, the tandem seal directly engages a radially-outwardly facing surface of the attachment portion of the blade track segment such that the tandem seal does not exert forces directly onto the runner of the blade track segment. The attachment portion of the blade track segment has an L-shaped cross-sectional shape with a radially-extending portion and an axially-extending portion, and wherein the tandem seal engages the axially-extending portion.

In illustrative embodiments, the wire seal is a single strand of solid metallic material having a round cross section. The rope seal is compressed in the axial direction by the carrier segment and the blade track segment. The rope seal is compressed in the radial direction between the carrier segment and the blade track segment. The rope seal includes a ceramic-containing core surrounded by the metallic overbraid sheath. The rope seal has a diameter larger than the wire seal.

In illustrative embodiments, the tandem seal directly engages a radially-outwardly facing surface of the runner included in the blade track segment. The radially-inwardly opening channel of the carrier is defined in part by a ramped surface that extends both axially and radially to define an acute angle with the central axis. The wire seal is arranged to directly engage the ramped seal surface.

According to another aspect of the present disclosure an assembly adapted for use in a gas turbine engine includes a carrier, a supported component, and a tandem seal. The carrier component includes metallic materials. The supported component includes ceramic matrix composite materials.

In illustrative embodiments, the tandem seal is received in a channel formed in the carrier component to locate the tandem seal relative to the supported component. The tandem seal engages the supported component to block the movement of gasses through an interface between the carrier component and the supported component. The tandem seal includes a wire seal and a rope seal.

In illustrative embodiments, the tandem seal is arranged to separate a first compartment configured to be pressurized at a first level during use of the assembly in a gas turbine engine and a second compartment configured to be pressurized at a second level, greater than the first level, during use of the assembly in a gas turbine engine. The rope seal is arranged axially between the wire seal and the second compartment. The wire seal is a single strand of solid metallic material having a round cross section. The rope seal includes a metallic braided sheath.

In illustrative embodiments, the rope seal is compressed in the channel and directly engages the wire seal to resist movement of the wire seal within the channel. The channel of the carrier component is defined in part by a ramped surface that extends both axially and radially relative to a central engine axis to define an acute angle with the central engine axis. The wire seal is arranged to directly engage the ramped seal surface.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
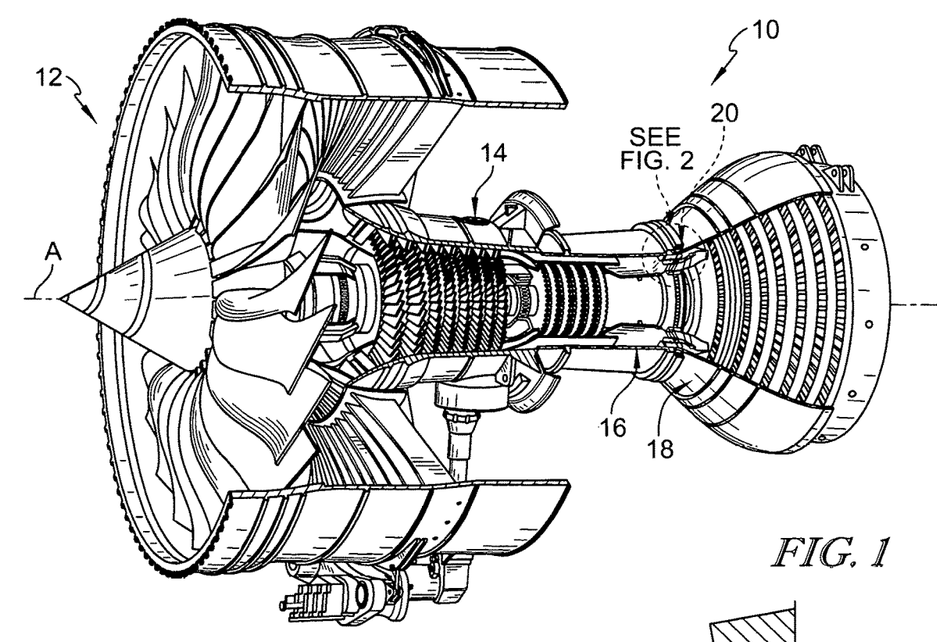
FIG. 1 is a cut-away perspective view of a gas turbine engine showing that the exemplary engine includes a fan driven by an engine core having a compressor, a combustor, and a turbine.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
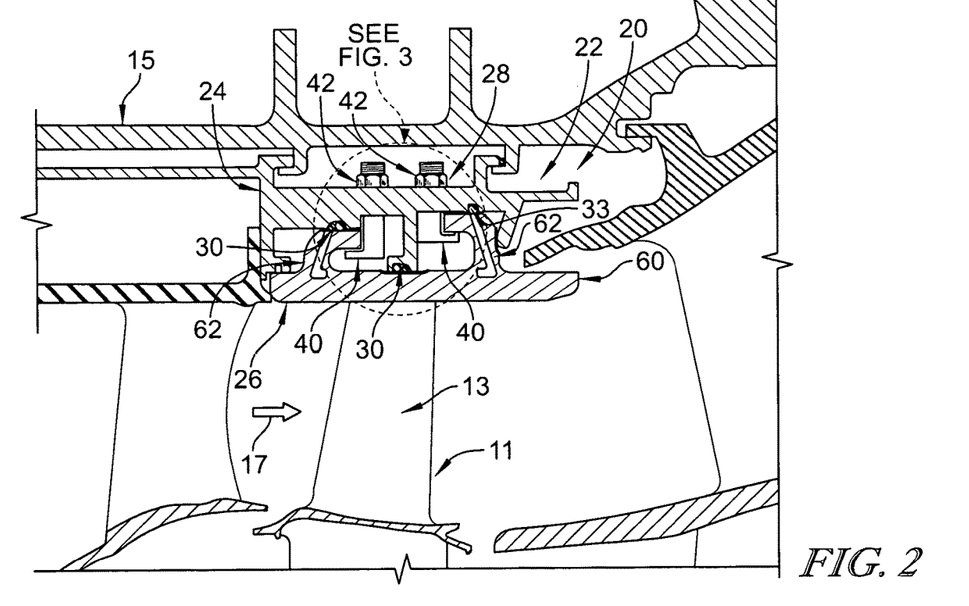
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
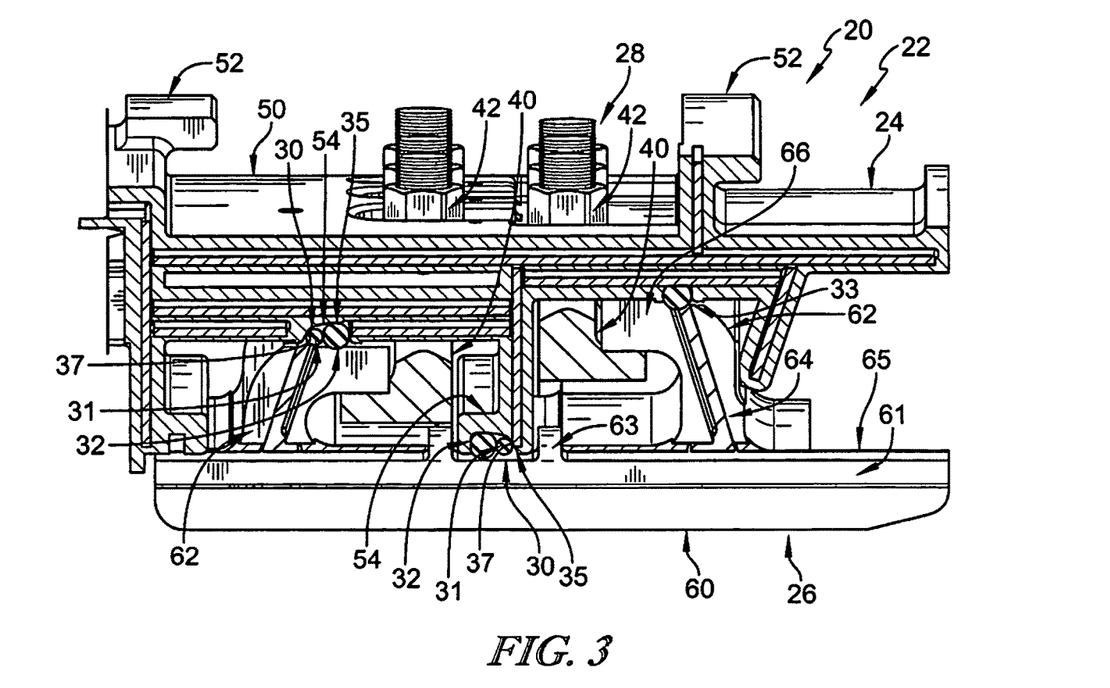
FIG. 3 is a detail view of a portion of FIG. 2 showing a turbine shroud segment that includes a carrier segment, a blade track segment, tandem seals that block the movement of gas through interfaces between the carrier segment and the blade track segment, and a mounting system for coupling the blade track segment to the carrier segment.
Figure 4:
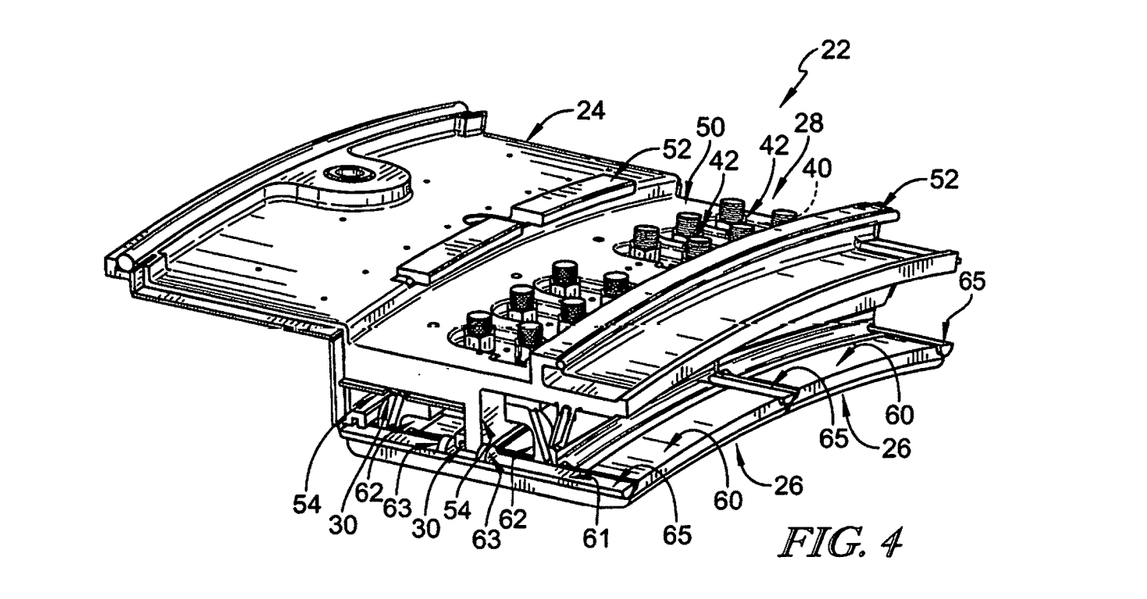
FIG. 4 is a perspective view of the turbine shroud segment of FIGS. 2 and 3 showing that the assembled turbine shroud segment is generally arcuate and extends part way around a central axis.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Figure 5:
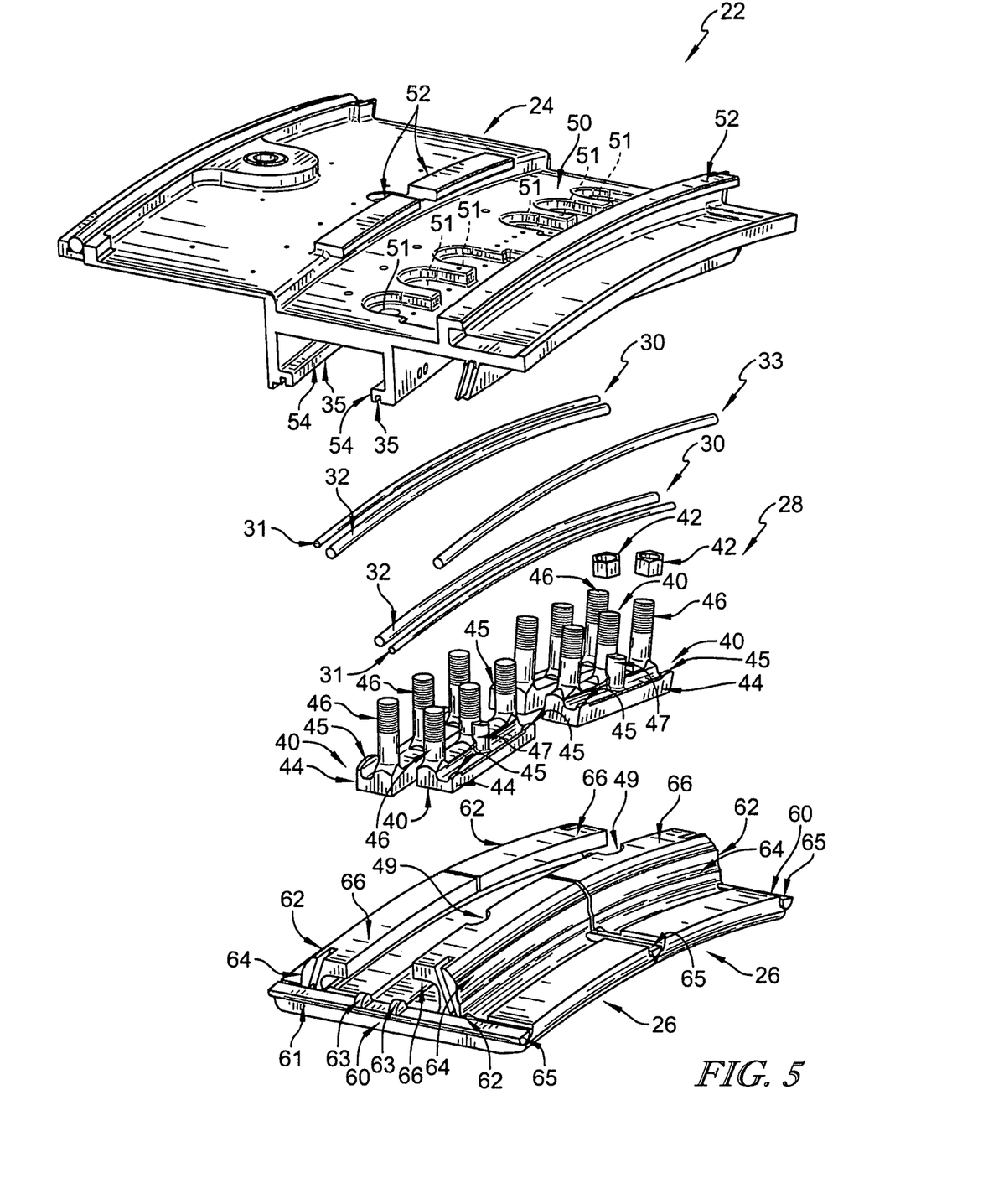
FIG. 5 is an exploded perspective assembly view of the turbine shroud segment of FIGS. 3 and 4 showing that the tandem seals of the blade track segment each include a rope seal and a wire seal sized to be received in a seal-receiving channel formed by the carrier, and showing that the mounting system includes a plurality of braces each having threaded shafts and a bracket that engages hangers included in a blade track segment.

Each shroud segment 22 includes a carrier segment 24, a pair of blade track segments 26, a mounting system 28, and a plurality of tandem seals 30 as shown in FIGS. 3-5. The carrier segment 24 is a metallic component mounted in engine 10 and is configured to support the blade track segment 26 in position adjacent to the blades 13 of the turbine wheel assembly 11. The blade track segments 26 are substantially similar and are ceramic-matrix composite components adapted to withstand high temperatures and directly faces blades 13 that interface with high temperature gasses. There could be a different number of blade track segments 26 per carrier segment 24 in other embodiments. The mounting system 28 is configured to couple the blade track segment 26 to the carrier segment 24 such that the blade track segment 26 is properly located. The tandem seals 30 are arranged radially between the carrier segment 24 and the blade track segments 26 such that they block the flow of gasses between the carrier segment 24 and the blade track segment 26.

In the illustrative embodiment, the tandem seals 30 are configured to accommodate differing rates of expansion and contraction experienced by the carrier segment 24 and the blade track segments 26 during use of the shroud segment 22 in engine 10. Each tandem seal 30 includes a wire seal 31 and a rope seal 32 that are both arranged in a single seal-receiving channel 35 as shown in FIG. 5. The rope seal 32 is compressed between the carrier segment 24 and the blade track segment 26 to push the wire seal 31 into position engaging both the carrier segment 24 and the blade track segment 26 to close a gap between the components.

The mounting system 28 is configured to couple the blade track segments 26 to a corresponding carrier segment 24 upon radial movement of the blade track segment 26 relative to the carrier segment 24 as suggested in FIG. 5. Accordingly, the tandem seals 30 can be maintained in position radially between the blade track segment 26 and the carrier 24 during assembly without having to accommodate circumferential sliding of the blade track segment 26 relative to the carrier 24. The mounting system 28 illustratively includes a plurality of braces 40 and threaded nuts 42 as shown in FIG. 5. Each brace 40 engages the blade track segment 26 and extends through the carrier segment 24. The threaded nuts 42 engage the braces and generally fix both the braces 40 and the blade track segments 26 in place relative to the carrier segment 24 as shown in FIGS. 3 and 4.

The carrier segment 24 included in each shroud segment 22 is formed to include a body plate 50, case hangers 52, and seal supports 54 as shown in FIGS. 3-5. The body plate 50 is illustratively an arcuate plate shaped to extend part-way around the central axis A and formed to include holes 51 through which braces 40 of the mounting system 28 extend. The case hangers 52 are configured to couple the shroud segment 22 to a turbine case or other structure and extend outward in a radial direction from the body plate 50. The seal supports 54 extend inward in a radial direction from the body plate 50 and each defines a corresponding seal-receiving channel 35 that receives a tandem seal 30.

The blade track segments 26 of each shroud segment 22 illustratively are the direct gas path interface of the shroud segment 22 and face the hot, high-pressure gasses interacting with the blades 13 of the turbine wheel 11 as suggested in FIG. 2. Each blade track segment 26 is formed to include a runner 60 and a plurality of hangers 62 as shown in FIG. 5. The runner 60 is arcuate and extends part-way around the central axis as shown in FIG. 5. The hangers 62 each extend outward in the radial direction from the runner 60 and allow for attachment of the blade track segment 26 to the carrier segment 24 via the mounting system 28. Each hanger 62 illustratively has an L-shaped cross-sectional shape when viewed circumferentially along the runner 60 having a radially extending portion 64 and an axially-extending portion 66. In other embodiments, the hangers 62 may have a T-shape, a fir-tree shape, a dovetail shape, a U-shape, a box shape, or other suitable shape.

Circumferential seal members 65 may be used between blade track segments 26 as shown in FIG. 5. The circumferential seal members 65 are illustratively received in channels formed by chamfers formed at circumferential ends of the runners 60 included in each blade track segment 26. The circumferential seal members 65 have a half cylinder portion 61 received in the channels and locating fins 63 that extend radially out from the channel. One of the tandem seal receivers 54 of the carrier segment 24 is located between the locating fins 63 to axially locate the circumferential seal members. Further, the tandem seal 30 engages and seals against the circumferential seal members 65 as suggested in FIG. 3.

Figure 6:
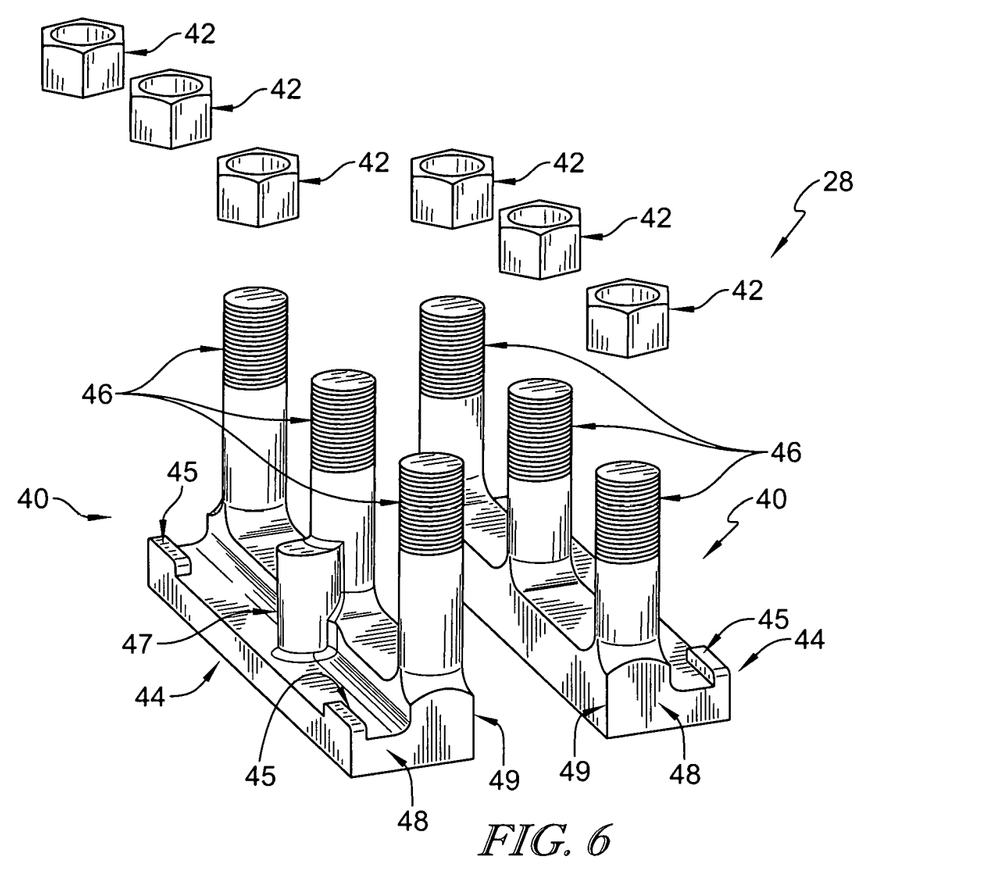
FIG. 6 is a detailed perspective view of the mounting system of FIG. 5.

Turning again to the mounting system 28, each brace 40 included in the system 40 illustratively includes a bracket 44 that engages a corresponding blade track segment 26 and a threaded shaft 46 that extends through a corresponding carrier segment 24 as shown in FIGS. 4-6. The brackets 44 illustratively engage axially-extending portions 66 of each hanger 62. The threaded shafts 46 extend from the brackets 44 through holes 51 formed in the body plate 50 of the carrier segment 26. Threaded nuts 42 of the mounting system 28 engage the threaded shafts 46 radially outward of the body plate 50 to secure the braces 40 in place relative to the carrier segment 24.

The brackets 44 of braces 40 included in the exemplary embodiment are arcuate and extend part-way around the central axis A of the engine 10 as shown in FIG. 5. In another embodiment, the brackets 44 could be generally straight. Each bracket 44 has an L-shaped cross-sectional shape when viewed circumferentially along the runner 60 of a corresponding blade track segment 26 such that each bracket 44 has an axially-extending portion 48 and a radially-extending portion 49. The axially-extending portion 48 of the bracket 44 is arranged radially inward of the axially-extending portion 66 of the hangers 62 included in the blade track segments 26. Optional load pads 45 are also included in the bracket 44 and directly engage the hangers 62 of the blade track segment 26. The load pads 45 are circumferentially spaced apart from one another and extend radially-outward from the axially-extending portion 66. In illustrative embodiments, the load pads 45 may be machined to created controlled locating surfaces for positioning the blade track segment 26 relative to the carrier segment 24.

The threaded shafts 46 of the braces 40 are circumferentially spaced apart from one another and extend from the radially-extending portion 49 of the bracket 44 as shown in FIG. 5. In the illustrative embodiment, a central one of the threaded shafts 46 extends substantially perpendicular to the central axis A while the other shafts 46 extend parallel to the central threaded shaft 46. Accordingly, the holes 51 in the carrier segment 24 can be sized to accommodate radial movement perpendicular to the axis A of the shafts 46 during assembly. If each shaft 46 was perpendicular to the axis A, at least one of the holes 51 might have to be formed as a slot to accommodate assembly. In other embodiments, the shafts 46 may not be threaded but may rather be secured by other means (i.e. Belleville washers, pins, clamps, retaining rings, etc.)

In the illustrated embodiment, the braces 40 also include anti-rotation pins 47 as shown in FIGS. 5 and 6. The anti-rotation pin 47 extends into corresponding anti-rotation notches 49 formed in hangers 62 of blade track segments 26 to block circumferential movement of the blade track segment 26 relative to the carrier segment 24. The anti-rotation pins 47 are integrated into shafts 46 of the braces 40 to reduce part count and control tolerances of the segment 22 assembly.

In the illustrative embodiment, the seal-receiving slots 35 are defined at least in part by a ramped surface 37 configured to guide the wire seal 31 into a position engaging both the carrier segment 24 and the blade track segment 26 as shown in FIG. 3. The ramped surface 37 extends both axially and radially to define an acute angle with the central axis A. The rope seal 32, when compressed, and gas pressure applied to the tandem seal 30 push the wire seal 31 along the ramped surface 37 so that the wire seal 31 engages both the carrier segment 24 and the blade track segment 26 such that the wire seal 31 blocks gas from moving past tandem seal 30.

The tandem seals 30 are illustratively made up of exactly two cords of material (wire seal 31 and rope seal 32) but may be made up of more cords in some embodiments. The wire seal 31 is illustratively a single strand of round metallic material that blocks movement of gasses through a gap between the carrier segment 24 and the blade track segment 26. The rope seal 32 is illustratively a compressible seal made of a ceramic-containing core with a braided metallic sheath. Using metallic sheath allows the ceramic-containing core to be damaged and lost over time while allowing the rope seal 32 to continue performing its function even after degradation of the rope seal 32. Single chord seals may also be used with tandem seals 30.

In the illustrated embodiment of FIGS. 2-5, the tandem seals 30 are arranged to engage one of the hangers 62 and the runner 60 of the blade track segment 26 as shown specifically in FIG. 2. More particularly, one tandem seal 30 engages a radially outer surface of the axially-extending portion 66 of a hanger 62. A second tandem seal 30 engages a radially outer surface of the runner 60 included in the blade track segment 26 at a location axially between hangers 62. Accordingly, in this embodiment, neither tandem seal 30 is compressed against cantilevered portions of the runner 60 forward or aft of the hangers 62.

Figure 7:
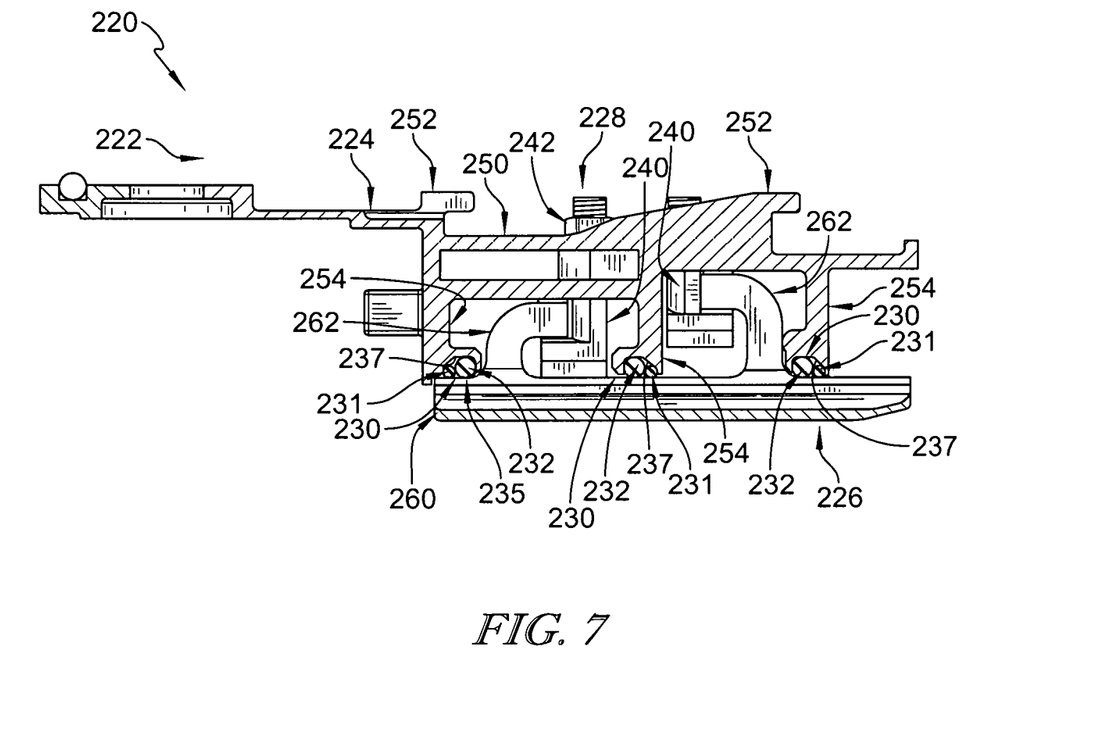
FIG. 7 is a detailed cross-sectional view of another segmented turbine shroud showing that each turbine shroud segment includes a carrier segment, a blade track segment, tandem seals that block the movement of gas through interfaces between the carrier segment and the blade track segment, and a mounting system for coupling the blade track segment to the carrier segment.
Figure 8:
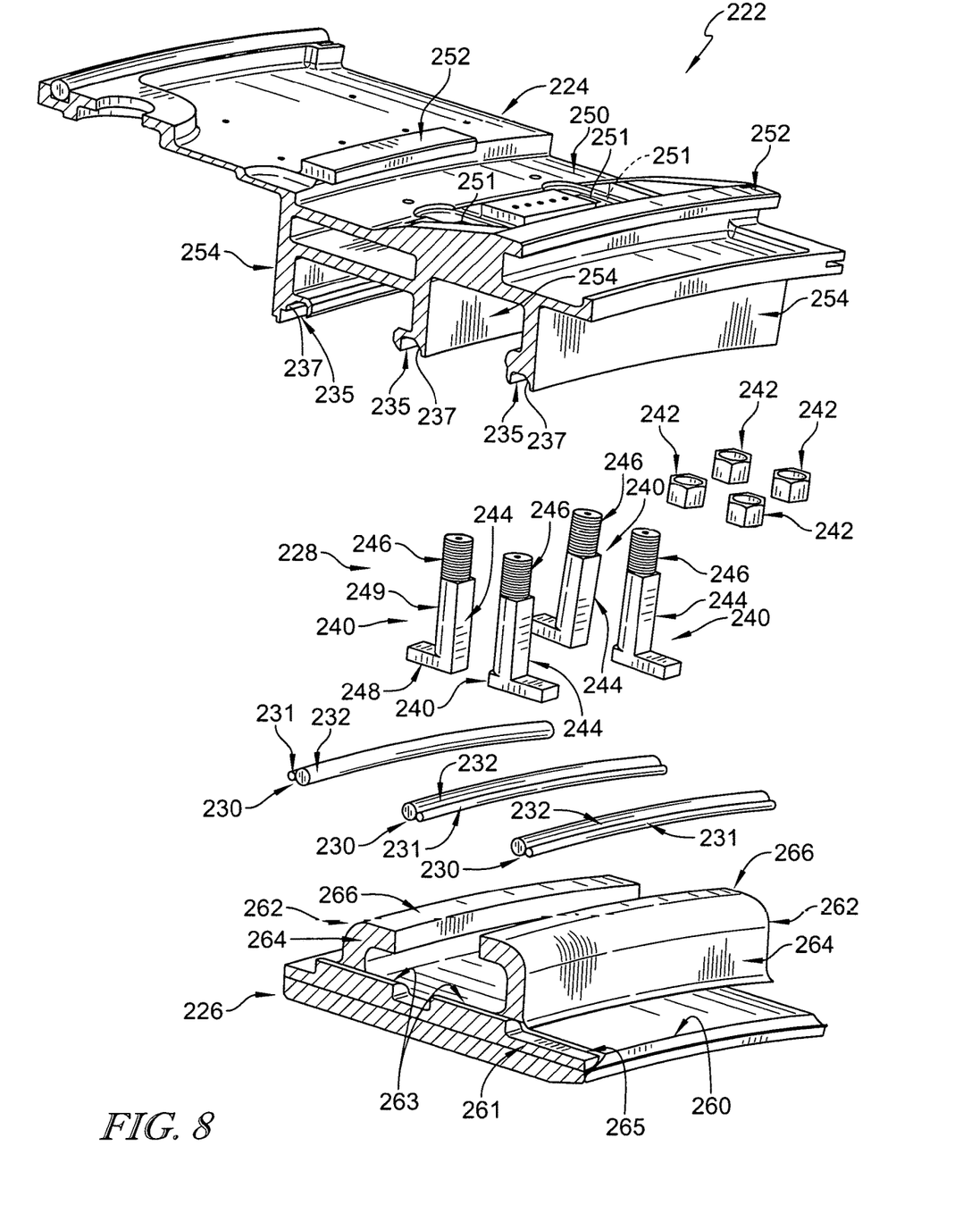
FIG. 8 is an exploded perspective assembly view of the turbine shroud segment of FIG. 7 showing that the tandem seals of the blade track segment each include a rope seal and a wire seal sized to be received in a seal-receiving channel formed by the carrier, and showing that the mounting system includes a plurality of braces each having threaded shafts and a bracket that engages hangers included in a blade track segment.

A second turbine shroud 220 is shown in FIGS. 7 and 8. The turbine shroud 220 is configured for use in the engine 10 and is substantially similar to the turbine shroud 20 shown in FIGS. 1-6 and described herein. Accordingly, similar reference numbers in the 200 series indicate features that are generally shared between the turbine shroud 20 and the turbine shroud 220 (i.e. 222, 224, 235, 237, 242, 244, 248, 249, 250, 251, 252, 254, 261, 263, 264, 265, 266) except as modified in the description below and drawings presented. The description of the turbine shroud 20 is hereby incorporated by reference to apply to the turbine shroud 220, except in instances when it conflicts with the specific description and drawings of the turbine shroud 220.

The turbine shroud 220 includes a mounting system 228 that having braces 240 that each include only one threaded shaft 246 as shown in FIG. 8. The independent braces 240 are circumferentially spaced apart from one another around a central axis of the turbine shroud 220.

In the embodiment of FIGS. 7 and 8, the tandem seals 230 are arranged to engage the runner 260 of the blade track segment 226 as shown specifically in FIG. 7. More particularly, a tandem seal 230 engages the runner 260 of the blade track segment 226 axially forward of the hangers 262, axially between the hangers 262, and axially aft of the hangers 262.

Figure 9:
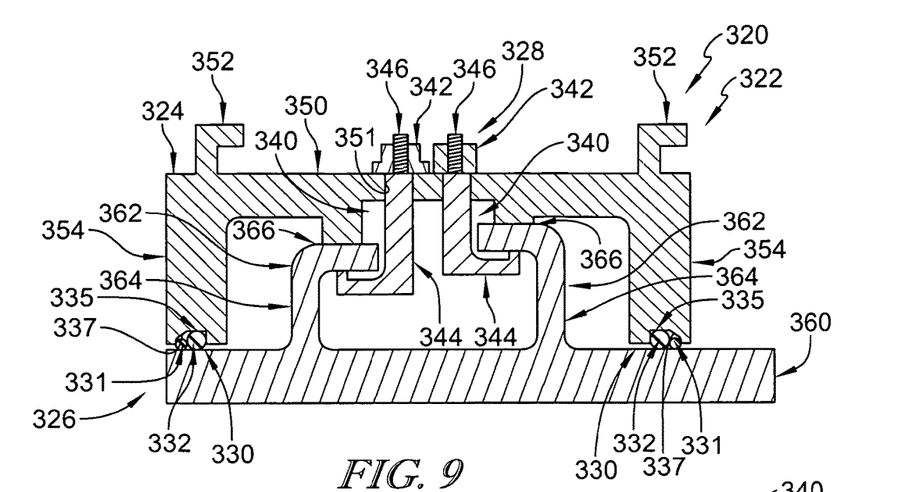
FIG. 9 is a detailed cross-sectional view of another segmented turbine shroud showing that each turbine shroud segment includes a carrier segment, a blade track segment, tandem seals that block the movement of gas through interfaces between the carrier segment and the blade track segment, and a mounting system for coupling the blade track segment to the carrier segment.

A third turbine shroud 320 is shown in FIG. 9. The turbine shroud 320 is configured for use in the engine 10 and is substantially similar to the turbine shroud 20 shown in FIGS. 1-6 and described herein. Accordingly, similar reference numbers in the 300 series indicate features that are generally shared between the turbine shroud 20 and the turbine shroud 320 (i.e. 322, 324, 335, 337, 342, 348, 349, 350, 351, 352, 354, 361, 363, 364, 365, 366) except as modified in the description below and drawings presented. The description of the turbine shroud 20 is hereby incorporated by reference to apply to the turbine shroud 320, except in instances when it conflicts with the specific description and drawings of the turbine shroud 320.

Figure 10:
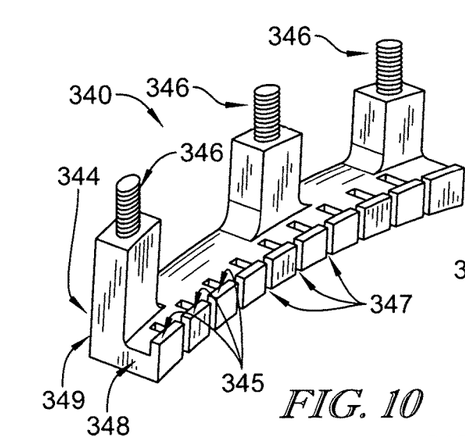
FIG. 10 is a detailed perspective view of a brace included in the mounting system of FIG. 9 showing a brace included in the mounting system that has threaded shafts and a bracket that engages hangers included in a blade track segment.
Figure 11:
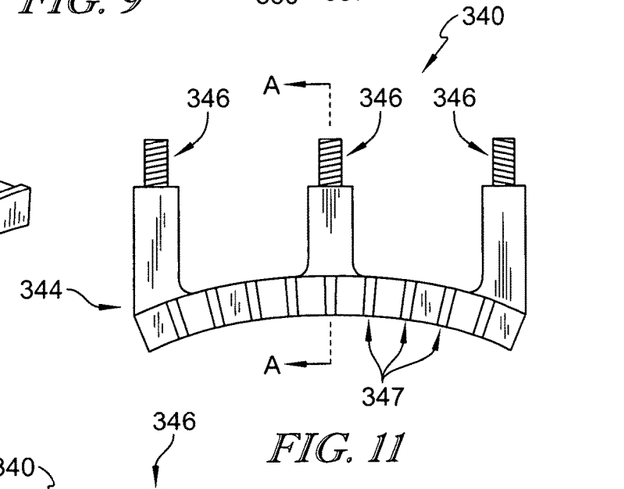
FIG. 11 is a front elevation view of the brace of FIG. 10 showing that the bracket of the brace is broken into a number of tabs separated by slots to optimize the stiffness of the brace.
Figure 12:
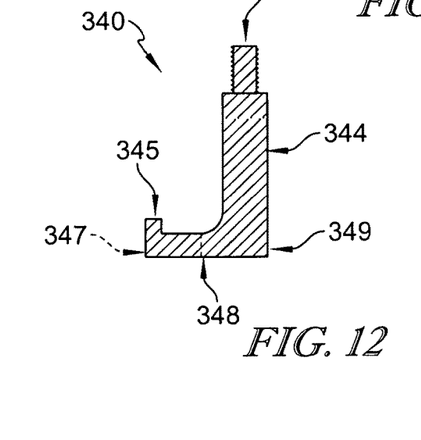
FIG. 12 is a cross sectional view of the brace of FIG. 11 taken along line A-A showing that the bracket of each brace has a generally L-shaped cross-section.

The turbine shroud 320 includes a mounting system 328 that having braces 340 that incorporates slots 347 into the bracket 344 as shown in FIGS. 10-12. More specifically, the brackets 344 are formed to include a plurality of circumferentially spaced apart slots 347 extending through the substantially axially-extending portion 344 of the bracket to allow for control of stiffness and engagement.

In the embodiment of FIG. 9, the tandem seals 330 are arranged to engage the runner 360 of the blade track segment 326 as shown specifically in FIG. 9. More particularly, a tandem seal 330 engages the runner 260 of the blade track segment 226 axially forward of the hangers 362 and axially aft of the hangers 362 as shown.

Figure 13:
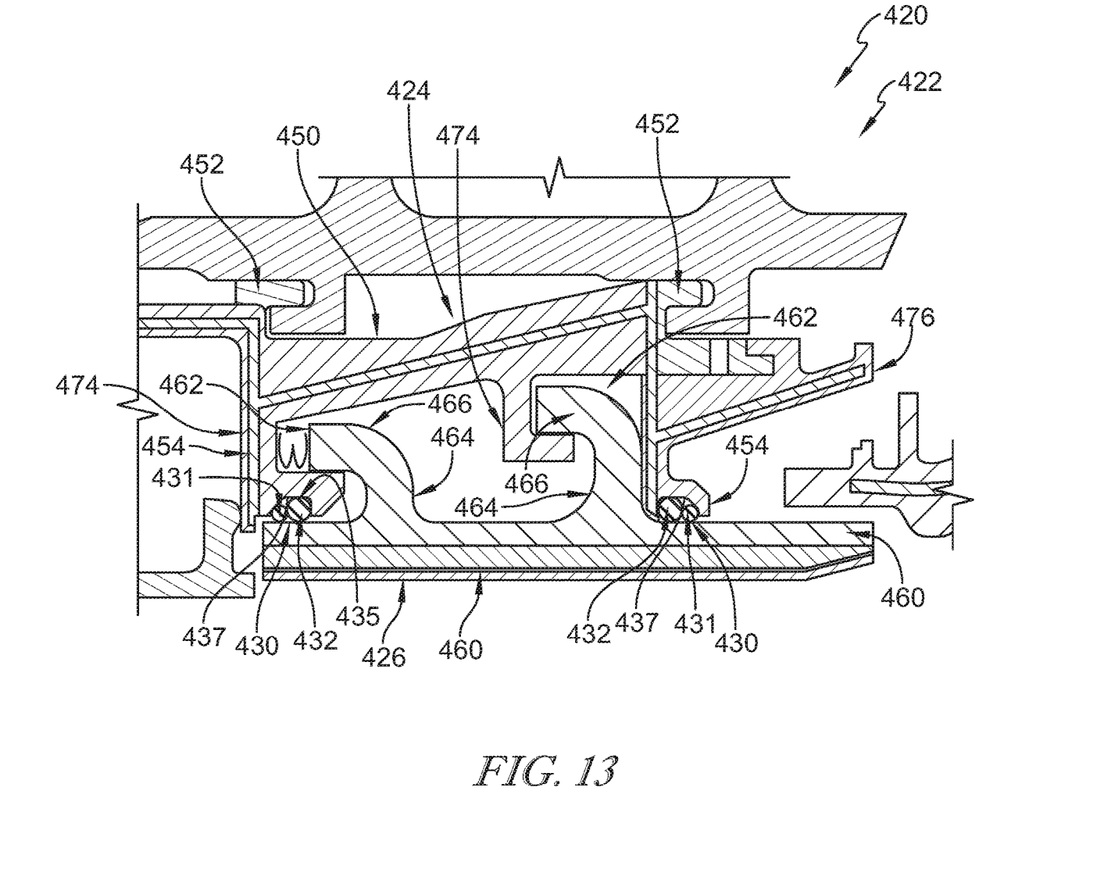
FIG. 13 is a detailed cross-sectional view of another segmented turbine shroud showing that each turbine shroud segment includes a carrier segment, a blade track segment, and tandem seals that block the movement of gas through interfaces between the carrier segment and the blade track segment.

A fourth turbine shroud 420 is shown in FIG. 13. The turbine shroud 420 is configured for use in the engine 10 and is substantially similar to the turbine shroud 20 shown in FIGS. 1-6 and described herein. Accordingly, similar reference numbers in the 400 series indicate features that are generally shared between the turbine shroud 20 and the turbine shroud 420 (i.e. 435, 437, 450, 452, 454, 464, 466) except as modified in the description below and drawings presented. The description of the turbine shroud 20 is hereby incorporated by reference to apply to the turbine shroud 420, except in instances when it conflicts with the specific description and drawings of the turbine shroud 420.

The turbine shroud 420 does not include a mounting system like included in turbine shroud 20 as shown in FIG. 13. Rather, the carrier segment 424 of each shroud segment 422 is formed to include brackets 474 and a retainer 476 that couple the blade track segment 426 to carrier segment 424. The brackets 474 have a L-shaped cross sectional shape that engage the hangers 462 of the blade track segment 426. The retainer 476 blocks disengagement of the hangers 462 from the brackets 474.

In the embodiment of FIG. 13, the tandem seals 430 are arranged to engage the runner 460 of the blade track segment 426 as shown specifically in FIG. 13. More particularly, a tandem seal 430 engages the runner 460 of the blade track segment 426 axially forward of the hangers 462 and axially aft of the hangers 462 as shown.

Figure 14:
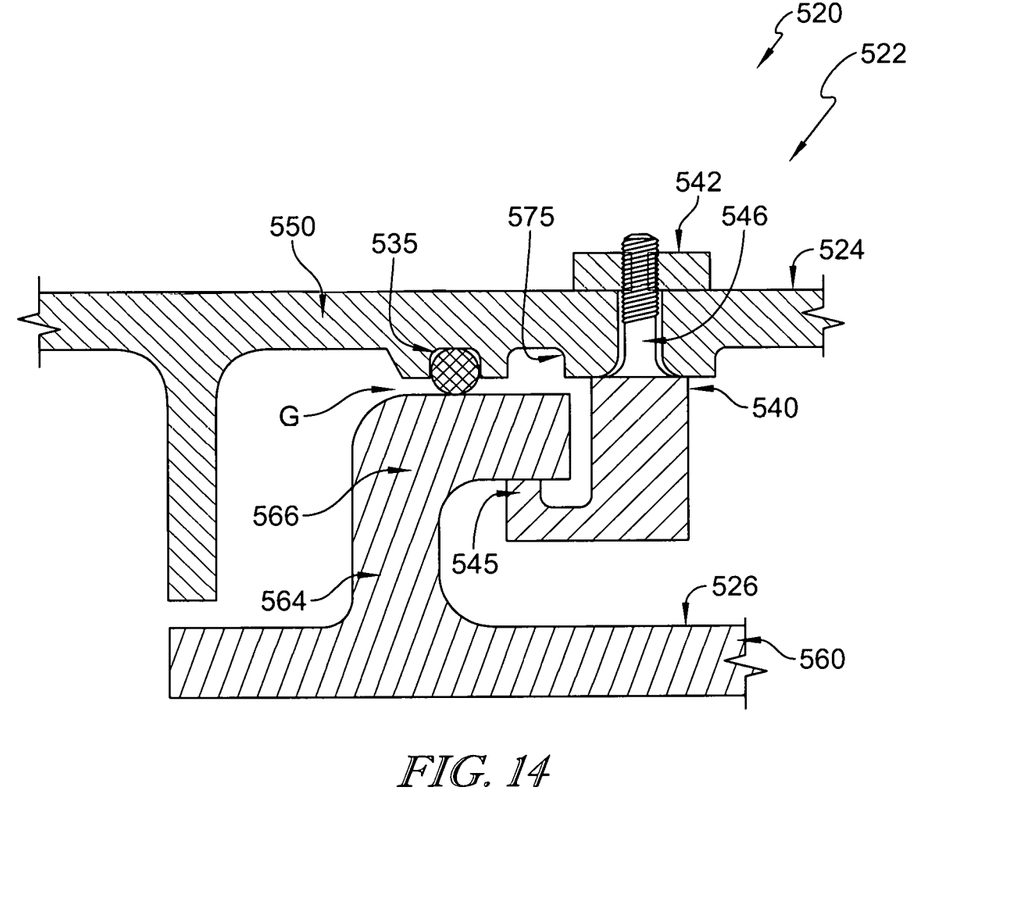
FIG. 14 is a detailed cross-sectional view of another segmented turbine shroud showing that each turbine shroud segment includes a carrier segment, a blade track segment, and location pads that engage the bracket of the mounting system brace when the brace reaches a fully installed position to block additional movement of the brace through the carrier locating the blade track segment and maintaining a predetermined gap between the carrier segment and the blade track segment.

A fifth turbine shroud 520 is shown in FIG. 14. The turbine shroud 520 is configured for use in the engine 10 and is substantially similar to the turbine shroud 20 shown in FIGS. 1-6 and described herein. Accordingly, similar reference numbers in the 500 series indicate features that are generally shared between the turbine shroud 20 and the turbine shroud 520 (i.e. 522, 535, 542, 560, 564, 566) except as modified in the description below and drawings presented. The description of the turbine shroud 20 is hereby incorporated by reference to apply to the turbine shroud 520, except in instances when it conflicts with the specific description and drawings of the turbine shroud 520.

The turbine shroud 520 includes locating pads 575 adapted to stop braces 540 from further movement through the carrier 524 when they are fully installed as shown in FIG. 14. The locating pads 575 extend inwardly from the body plate 550 of the carrier 524 in a radial direction toward the central axis 11. In the illustrated embodiment, the locating pads 575 are arranged around apertures through which the shafts 546 of the braces 540 extend through the carrier segment 524. Locating pads 575 cooperate with load pads 545 to radially locate the blade track segment 526 relative to carrier segment 524.

In the design of FIG. 14, a gap G is formed between the carrier segment 524 and the blade track segment 526. A compressible seal 532 is arranged in the gap G between the carrier segment 524 and the blade track segment 526 to resist the passage of gasses through the gap G and to maintain the blade track segment 526 in spaced apart relation to the carrier segment 524.

Figure 15:
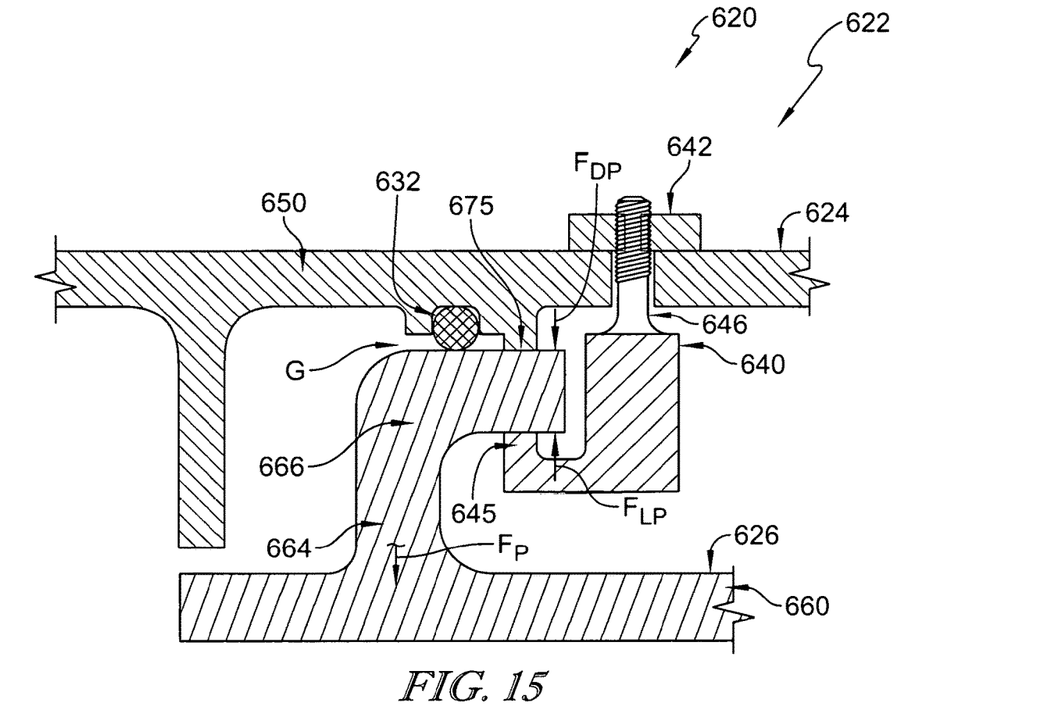
FIG. 15 is a detailed cross-sectional view of another segmented turbine shroud showing that each turbine shroud segment includes a carrier segment, a blade track segment, and location pads that engage the hanger of the blade track segment when the brace reaches an installed position to block additional movement of the brace through the carrier locating the blade track segment.
Figure 16A:
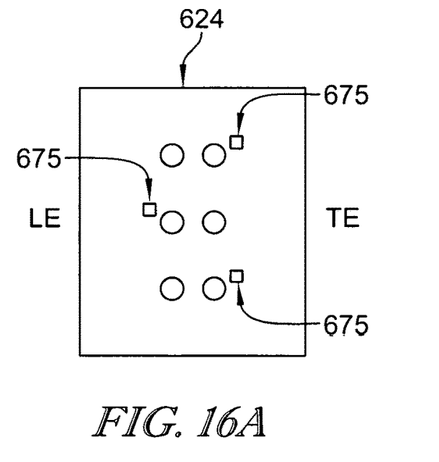
FIG. 16A is a radially-outwardly looking plan view of a portion of the carrier segment included in FIG. 15 showing the location of the various locating pads used to locate the blade track segment relative to the carrier segment.
Figure 16B:
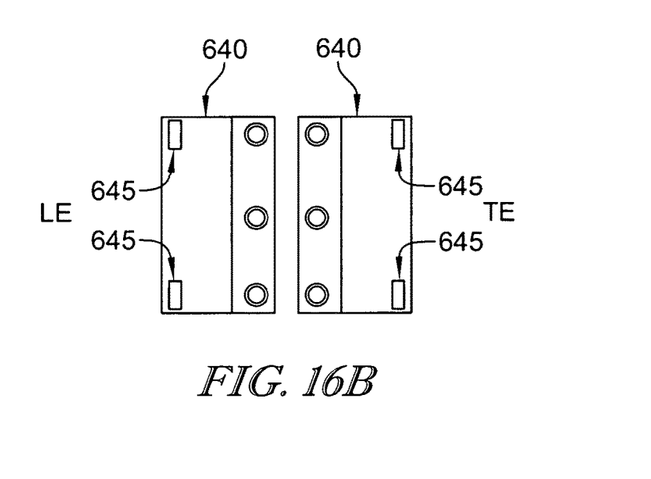
FIG. 16B is a radially-inwardly looking plan view of the braces included in the mounting system of FIG. 15 showing the location of load pads that engage the hangers of the blade track segment to block radially-inward movement of the blade track segment relative to the carrier segment when the brace reaches the installed position.

A sixth turbine shroud 520 is shown in FIGS. 15, 16A, and 16B. The turbine shroud 620 is configured for use in the engine 10 and is substantially similar to the turbine shroud 20 shown in FIGS. 1-6 and described herein. Accordingly, similar reference numbers in the 600 series indicate features that are generally shared between the turbine shroud 20 and the turbine shroud 620 (i.e. 622, 632, 642, 660, 664, 666) except as modified in the description below and drawings presented. The description of the turbine shroud 20 is hereby incorporated by reference to apply to the turbine shroud 620, except in instances when it conflicts with the specific description and drawings of the turbine shroud 520.

The turbine shroud 620 includes locating pads 675 adapted to stop braces 640 from further movement through the carrier 624 when they are fully installed as shown in FIG. 15. The locating pads 675 extend inwardly from the body plate 650 of the carrier 624 in a radial direction toward the central axis 11. In the illustrated embodiment, the locating pads 675 are arranged to engage the hangers of the blade track segments 626 when fully installed. Locating pads 675 cooperate with load pads 645 to radially locate the blade track segment 626 positively relative to carrier segment 624.

Among other things, the present disclosure captures a way of using a wire seal (i.e. 31, 231, 331, 431) and a braid seal (i.e. 32, 232, 332, 432) in a novel way to seal gaps between components that will have thermal-mechanical movements. The seals are packaged in a unique groove and positioned such that a primary seal (wire) is maintained in position while the efficiency benefit of a secondary seal (braid) is also provided.

Designs in accordance with the present disclosure can seal a radial gap between two static components where the components are made from materials with different coefficients of thermal expansion (CTE). Therefore the gap between the components changes when the surrounding environment gets hotter or colder. The gap can have even larger variation if the as-cast or as-formed surfaces of the components are used as seal lands. In the illustrated embodiments, the inner, low CTE, component (blade track segment) grows more slowly when heated than the outer, high CTE component attachment structure (carrier segment).

The present disclosure provides a seal that will function in nearly all expected scenarios. The wire seal has been selected for this purpose. It is a solid metal seal that is used to limit the gap between the segment and the carrier. Degradation of the metal wire seal can be more predictable than the secondary seal and is not expected to fail over the required life. The secondary seal chosen is the braid seal which is compressed radially in the groove on the low pressure side of the tandem seal. The degradation of these seals is less predictable, but used in a green or new state will create a more effective flow restriction through the tandem seal.

To account for variation in surface location of the parts with respect to their own datums as well as variation in the part location in the assembly an angled face can be used to assist seating the wire seal against both the carrier angled face and outer diameter of the blade track segment. In the assembled state the braid seal is compressed axially and often radially. The axial compression will force the wire seal into contact on corresponding sealing faces. Even if the braid seal experiences some hysteresis (loss in ability to spring back to nominal shape), as long as the braid limits the wire from walking out of the wedge face the primary seal is maintained. The diameter of the wire is also chosen so that the cross sectional stiffness is limited so that it can deform the small amounts necessary to seal against both sealing surfaces (carrier and blade track segment).

In designs conforming to the present disclosure, the wire seal is the primary seal contact between the CMC segment and metal carrier. The braid seal is the secondary seal providing increased seal effectiveness and positioning of the wire seal. This configuration allows for a more open locating tolerance on the sealing surfaces. Accordingly, the present disclosure combines the use of two types of seals to provide a unique sealing solution.

Incorporation of a ramped seal surface as disclosed here may allow for location of the seal lands to float with respect to one another. Using one tandem (wire and braid) seal per carrier allows the seals to conform around the tolerances of one subassembly. Designs in accordance with this disclosure may reduce/eliminate the amount of backside machining that needs to be done to the CMC component (i.e. blade track segment). In some embodiments, for improved locational control, the segment seal lands can be machined to a tighter tolerance than the as-formed tolerance provides.

The present disclosure also teaches a hanger arrangement, described as a mounting system 28, 228, 328 for a CMC seal segment that utilizes a bolted arrangement to secure the CMC seal segment to a metallic carrier. This attachment arrangement incorporates an "L" shaped metallic hanger that is separate from the carrier, with one or a plurality of threaded features and one or a plurality of load pads. The hangers are installed in a fashion that the load pad(s) contact the underside of the CMC hanger feature and react pressure loads in operation. The threaded features are inserted thru the carrier where a nut is applied and tightened to draw the seal segment into its proper position against the carrier.

In the first embodiment (e.g. mounting system 28), the "L" shaped hanger has two load pads and three threaded features. This design allows the load pads to engage the CMC at two locations on the front hanger and two locations on the aft hanger while ensuring that engagement points are maintained in the event of the loss of a single threaded feature. By appropriately applying torque to the nuts, the CMC seal segment can be drawn into position while maintaining these four engagement points on the CMC. The threaded feature could have a female thread in the lower section of the hanger such that a bolt could then be inserted thru the case and threaded into the hanger.

A variation on this embodiment modifies the metallic hanger such that there are a plurality of metallic hangers with a single load pad and a single threaded feature (e.g. the embodiment of FIG. 8). This design is configured such that the nut on each of the metallic hangers may be torqued separately, thus providing engagement of each load pad individually and increasing the number of load contact points and distributing the load which can reduce stresses.

A variation on these embodiments may be to replace the two load pads with a plurality of load pads and include slices (slots) between the load pad area to reduce the stiffness as shown in FIGS. 10-12. This could be done to allow an increased number of loading points with a desired stiffness of the individual load pad protrusions.

A further embodiment is envisioned where the threaded feature could be eliminated and the retention of the hanger could be performed by a retaining ring, collet or cotter pin inserted above the carrier. One example of such an embodiment may be shown in FIG. 13.

It is envisioned that the use of a single intermediate metallic carrier with multiple load pads that interface with the CMC seal segment and a single or plurality of threaded features could allow the segment/metallic hanger assembly to be bolted into the carrier. The advantage of such a design is a minimization in part count and potential easier assembly.

In some embodiments, a compliant layer (RCA11539) between the metallic hanger(s) and the CMC seal segment may be included. The inclusion of a compliant layer could help to further distribute the load over a larger area and reduce peak stresses in the CMC seal segment. The compliant layer could take the form of a gasket type material such as Micaboard, a very low modulus metallic strip/structure, or a spring structure. Examples of such a compliant layer are shown in U.S. application Ser. No. 15/065,256 filed 9 Mar. 2016, which is hereby incorporated by reference in its entirety.

Features of the various embodiment disclosed herein are not necessarily exclusive of one another. As such it is appreciated and disclosed that features included in one or more embodiments may be incorporated into other embodiments where it is not explicitly presented.

Designs in accordance with FIG. 14 of the present disclosure include blade track segments (sometimes called seal segments), and braces that are assembled radially into carrier. Nuts are threaded onto brace threaded shafts and tightened against locating pads 575 that engage a bracket of the brace (sometimes called a shoulder stop). In this way, the load pads 545 on the braces locate the seal segment while the shoulder/stop interface locates the locating pads.

Such arrangements leave a gap between the outer face of the seal segment hanger and the carrier. This is acceptable since pressure loading during operating would load the seal segments inward, forcing them against the brace load pads.

As desired or needed, either a radially compressed seal 535 (as shown), a compliant layer, or a spring (such as a wage spring) could be located in this gap to ensure the seal segments are always biased against the braces' load pads whether the engine is running or not. This would ensure the seal segments do not rattle or shift during shipping, engine out flight, etc.

In the illustrated embodiment, no more than three load pads could be used to have deterministic loading. This is because the stiffness of the CMC material can be relatively high and the first points of contact will determine the location of the seal segment. CMC often does not have the flexibility required to deflect enough to contact additional load pads without overstressing the CMC.

Designs in accordance with FIG. 15 of the present disclosure include blade track segments (sometimes called seal segments and braces that are assembled radially into carrier. Nuts are threaded onto brace threaded shafts and tightened against datum locating pads 675. This tightly sandwiches the seal segment between the braces' load pads and the carrier's datum/locating pads.

Like the embodiment of FIG. 14, no more than three datum pads can be used to locate the seal segment against the carrier datum pads while having deterministic loading. However, the embodiment of FIG. 15 can allows four load pads 645 if two braces per segment are used. This is because the threaded joint between the brace threaded shafts and nuts has some ability for misalignment, allowing the braces to rock during assembly to find the surface of the CMC hanger.

The cold build clamping load is transmitted from the load pads, through the CMC hanger, into the datum pads. While the engine is shut down, the total load going through the load pads and datum pads is equal and is the same as the clamping load, $F_C$.

As the engine is operating, pressure loads on the backside typically apply a force inward on the seal segment. This total pressure load is shared between the hangers. Letting $F_P$ stand for the pressure load reacted by a given seal segment hanger, the free body diagram looks as follows:

Like any bolted joint, as the pressure load, $F_P$, is applied, the datum pad load, $F_{DP}$, is reduced according to the stiffnesses in the system. $F_P$ may or may not be adequate to reduce $F_{DP}$ to zero, at which point any additional pressure load, $F_P$, will result in a gap at the datum pads. The point at which this gapping begins will be determined by the amount of preload, $F_C$, applied to the brace threaded shafts by torqueing the nuts. This invention will function properly whether this gapping occurs or not.

A low preload (nut torque) would result in lower loads at the three points of contact at the datum pads. But it would increase the amount of altering load in the load pads and brace threaded shafts. A high preload (nut torque) would have the opposite effects. By adjusting the preload (nut torque) stresses and life of all parts can be optimized.

The use of four load pads enabled by this disclosure provides a design in which the pressure load can be split between four points of contact instead of three. This reduces stress around the load pads by reducing the load going through each load pad. It will also reduce bending stress since a hanger with one load pad results in higher bending stress in the CMC seal segment due to the longer moment arm of pressure acting near the edges of the seal segment.

In addition the use of four load points can enable minimization in radial shifting of the seal segment. This can be a consideration since engine efficiency is sensitive to turbine blade tip clearance. This is accomplished by aligning the fore and aft load pads circumferentially, effectively creating two axial lines of support that enable the seal segment to "flatten" during operation without shifting the whole segment in or out radially.

In some embodiments, only a single brace is used instead of two or more. In such embodiments, four point contact at the load pads would likely be omitted. The threaded joints would still allow misalignment, allowing the brace to tilt to find the underside of the hangers. However, it would likely only tilt until three points contacted, after which time the CMC is likely too stiff to deflect and share load with the fourth load point.

Also disclosed herein are design features for controlling rotation of blade track segments included in illustrated assemblies. According to one disclosed design a protrusion on a brace fits in a slot in the CMC hanger.

In other embodiments, pockets can be manufactured at either the datum/load pads or locating pads such that the pads extended into the pockets and contacted the bottom of the pocket. The sides of the pocket and pads would then contact if a force tries to rotate the seal segment relative to the carrier, effectively anti-rotating the seal segment.

Directions described in the present disclosure are generally taken as relative to the central axis A of the engine 10 as would be understood from the drawings. Accordingly, for purposes of understanding the shape and position of components described herein, the radial direction extends perpendicular to or away from the axis A, a axial direction extends parallel to or along the axis A, and a circumferential direction extends around the axis A. While this convention is generally adhered to, there may be particular statements that apply different conventions to enhance understanding of the structures disclosed herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment assembly adapted for use in a gas turbine engine, the turbine shroud segment comprising
   a carrier segment comprising metallic materials, the carrier segment formed to define an attachment-receiving space,
   a blade track segment comprising ceramic matrix composite materials, the blade track segment formed to include a runner shaped to extend partway around a central axis and a hanger that extends radially outward from the runner into the attachment-receiving space formed by the carrier segment, and
   a tandem seal received in a radially-inwardly opening channel formed in the carrier segment that engages the blade track segment to block the movement of gases through an interface between the carrier segment and the blade track segment, the tandem seal including a wire seal and a rope seal, wherein the wire seal is a single strand of solid metallic material and the rope seal is configured to be compressed between the carrier segment and the blade track segment while remaining engaged with the wire seal to bias the wire seal into engagement with the blade track segment and the carrier at the interface between the blade track segment and the carrier segment.

2. The turbine shroud segment assembly of claim 1, wherein tandem seal is arranged to separate a first compartment configured to be pressurized at a first level during use of the turbine shroud segment in a gas turbine engine and a second compartment configured to be pressurized at a second level, greater than the first level, during use of the turbine shroud in a gas turbine engine, and the rope seal is arranged axially between the wire seal and the second compartment.

3. The turbine shroud segment assembly of claim 1, wherein the tandem seal directly engages a radially-outwardly facing surface of the hanger of the blade track segment such that the tandem seal does not exert forces directly onto the runner of the blade track segment.

4. The turbine shroud segment assembly of claim 3, wherein the hanger of the blade track segment has an L-shaped cross-sectional shape with a radially-extending portion and an axially-extending portion, and wherein the tandem seal engages the axially-extending portion.

5. The turbine shroud segment assembly of claim 1, wherein the rope seal is compressed in the axial direction by the carrier segment and the blade track segment.

6. The turbine shroud segment assembly of claim 5, wherein the rope seal is compressed in the radial direction between the carrier segment and the blade track segment.

7. The turbine shroud segment assembly of claim 6, wherein the rope seal includes a ceramic-containing core surrounded by the metallic overbraid sheath.

8. The turbine shroud segment assembly of claim 6, wherein the rope seal has a diameter larger than the wire seal.

9. The turbine shroud segment assembly of claim 1, wherein the tandem seal directly engages a radially-outwardly facing surface of the runner included in the blade track segment.

10. The turbine shroud segment assembly of claim 1, wherein the radially-inwardly opening channel of the carrier is defined in part by a ramped surface that extends both axially and radially to define an acute angle with the central axis.

11. The turbine shroud segment assembly of claim 10, wherein the wire seal is arranged to directly engage the ramped seal surface.

12. An assembly adapted for use in a gas turbine engine, the assembly comprising
    a carrier component comprising metallic materials,
    a supported component comprising ceramic matrix composite materials, and
    a tandem seal (i) that is received in a channel formed in the carrier component to locate the tandem seal relative to the supported component and (ii) that engages the supported component to block the movement of gases through an interface between the carrier component and the supported component, the tandem seal including a wire seal and a rope seal,
    wherein the wire seal is a single strand of solid metallic material and the rope seal biases the wire seal into engagement with the supported component and the carrier component at the interface between the supported component and the carrier component.

13. The assembly of claim 12, wherein tandem seal is arranged to separate a first compartment configured to be pressurized at a first level during use of the assembly in a gas turbine engine and a second compartment configured to be pressurized at a second level, greater than the first level, during use of the assembly in a gas turbine engine, and the rope seal is arranged axially between the wire seal and the second compartment.

14. The assembly of claim 12, wherein the rope seal includes a metallic braided sheath.

15. The assembly of claim 12, wherein the rope seal is compressed in the channel and directly engages the wire seal to resist movement of the wire seal within the channel.

16. The assembly of claim 15, wherein the channel of the carrier component is defined in part by a ramped surface that extends both axially and radially relative to a central engine axis to define an acute angle with the central engine axis.

17. The assembly of claim 16, wherein the wire seal is arranged to directly engage the ramped seal surface.

18. An assembly adapted for use in a gas turbine engine, the assembly comprising
- a carrier component,
- a supported component coupled to the carrier component, and
- a tandem seal that is received in a channel formed in the carrier component to locate the tandem seal relative to the supported component and that engages the supported component to block the movement of gases through an interface between the carrier component and the supported component, the tandem seal including a wire seal and a rope seal, wherein the wire seal is a single strand of solid material and the rope seal biases the wire seal into engagement with the supported component and the carrier component at the interface between the supported component and the carrier component.

* * * * *